(12) United States Patent
Kadarkarai

(10) Patent No.: US 9,418,341 B1
(45) Date of Patent: Aug. 16, 2016

(54) DETERMINING QUALITY SIGNALS FOR ELECTRONIC MAIL OFFER CAMPAIGNS

(71) Applicant: GOOGLE INC., Mountain View, CA (US)

(72) Inventor: Jayaprabhakar Kadarkarai, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 315 days.

(21) Appl. No.: 14/095,989

(22) Filed: Dec. 3, 2013

(51) Int. Cl.
*G06N 99/00* (2010.01)

(52) U.S. Cl.
CPC ..................................... *G06N 99/005* (2013.01)

(58) Field of Classification Search
None
See application file for complete search history.

(56) References Cited

U.S. PATENT DOCUMENTS

| | | | | |
|---|---|---|---|---|
| 2005/0055275 A1* | 3/2005 | Newman | ................. | G06Q 30/02 705/14.41 |
| 2008/0262925 A1* | 10/2008 | Kim | ....................... | G06Q 30/02 705/14.27 |
| 2009/0157483 A1* | 6/2009 | Otto | ....................... | G06Q 30/02 706/45 |
| 2011/0010732 A1* | 1/2011 | Opdycke | ................ | G06Q 30/02 725/10 |
| 2011/0029382 A1* | 2/2011 | Narasimhan | ........... | G06Q 30/02 705/14.52 |
| 2011/0131166 A1* | 6/2011 | Li | ........................... | G06N 7/005 706/25 |
| 2012/0095835 A1* | 4/2012 | Makar | ............... | G06F 17/30867 705/14.53 |
| 2013/0124298 A1* | 5/2013 | Li | ...................... | G06Q 30/0241 705/14.42 |

* cited by examiner

*Primary Examiner* — Stanley K Hill
*Assistant Examiner* — Mikayla Chubb
(74) *Attorney, Agent, or Firm* — Johnson, Marcus & Isaacs, LLC

(57) ABSTRACT

A method for determining quality signals for offer campaigns comprises an offer system that receives information submitted by users, and analyzes it to learn features of each user and detect patterns. The offer system clusters the users, and transmits an offer to a limited number of users in each user cluster. It receives notification that a user interacted with the offer and determines a conversion rate for each cluster. If the conversion rate exceeds a pre-defined threshold, the offer system transmits the offer to the remaining users in the cluster. Alternatively, the features of the users are rendered into a multi-dimensional graph that plots the distribution of the users. The offer system marks a representation of each user that interacts with the offer on the graph to determine groupings of users. The offer system transmits the offer to the remaining users in each group.

21 Claims, 7 Drawing Sheets

DETERMINING QUALITY SIGNALS FOR ELECTRONIC MAIL OFFER CAMPAIGNS

TECHNICAL FIELD

The present disclosure relates generally to an offer system, and more particularly to methods and systems for determining quality signals for electronic mail offer campaigns.

BACKGROUND

Merchants offer coupons or rebates as incentives for purchasing particular products. Traditionally, coupons are distributed in a paper format. A user redeems the coupon by taking the physical coupon to a merchant and purchasing a product that satisfies the terms of the coupon. Other forms of traditional coupons include rebates for purchasing particular products, wherein after purchasing a product that satisfies the terms of the rebate offer, the user fills out and returns required forms to request the rebate.

Additionally, merchants have offered electronic offers. Such offers may be linked to merchant loyalty cards, wherein a user enrolls in a merchant's loyalty program and receives a loyalty card. A user then associates certain discounts to the loyalty card and redeems these discounts by presenting the loyalty card (or some form of identifying information, such as a telephone number) and the method of payment to the merchant when purchasing the discounted products. Alternatively, coupons and offers are distributed through electronic media, forums, and social networks. However, the coupons and offers cannot be changed once they are distributed through the electronic media. Once a few unpopular offers are distributed, the user is likely to stop reading future offers distributed.

SUMMARY

In certain example aspects described herein, a method for determining quality signals for offer campaigns comprises an offer system that receives information submitted by each user, and analyzes the information to learn features of the user and detect patterns. Using the feature patterns identified and/or predicted, the offer system clusters the users. The offer system transmits the offer to a limited number of registered users in each user cluster.

The user selects or otherwise interacts with the offer distributed by the offer system. By selecting the offer, the user authorizes transmission of a notification to the offer system that the user is interested in the offer. The offer system receives notification that the user interacted with the offer. Based on the information received, the offer system determines the conversion rate, or other metric used to determine the efficiency of the limited offer campaign. The offer system analyzes the conversion rate or other metric and determines if it exceeds a pre-defined threshold. Based on the offer system's analysis, it transmits the offer to the remaining users in each identified user cluster where the conversion rate exceeds the pre-defined threshold.

In another example embodiment, the features of the users are rendered into a 2-Dimensional graph that plots the distribution of the users. In this embodiment, the offer system transmits the offer to a limited number of registered users and receives notification that the user interacted with the offer. The offer system marks a representation of each user that interacted with the offer on the graph. The offer system, an analyst, or an offer system operator analyses the graph and the marked representations to determine groupings of users that will likely be interested in the offer and transmits the offer to the remaining users in the group.

In an example embodiment, these methods are repeated with multiple offers to determine an order of display of the offer for users within each cluster or group.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
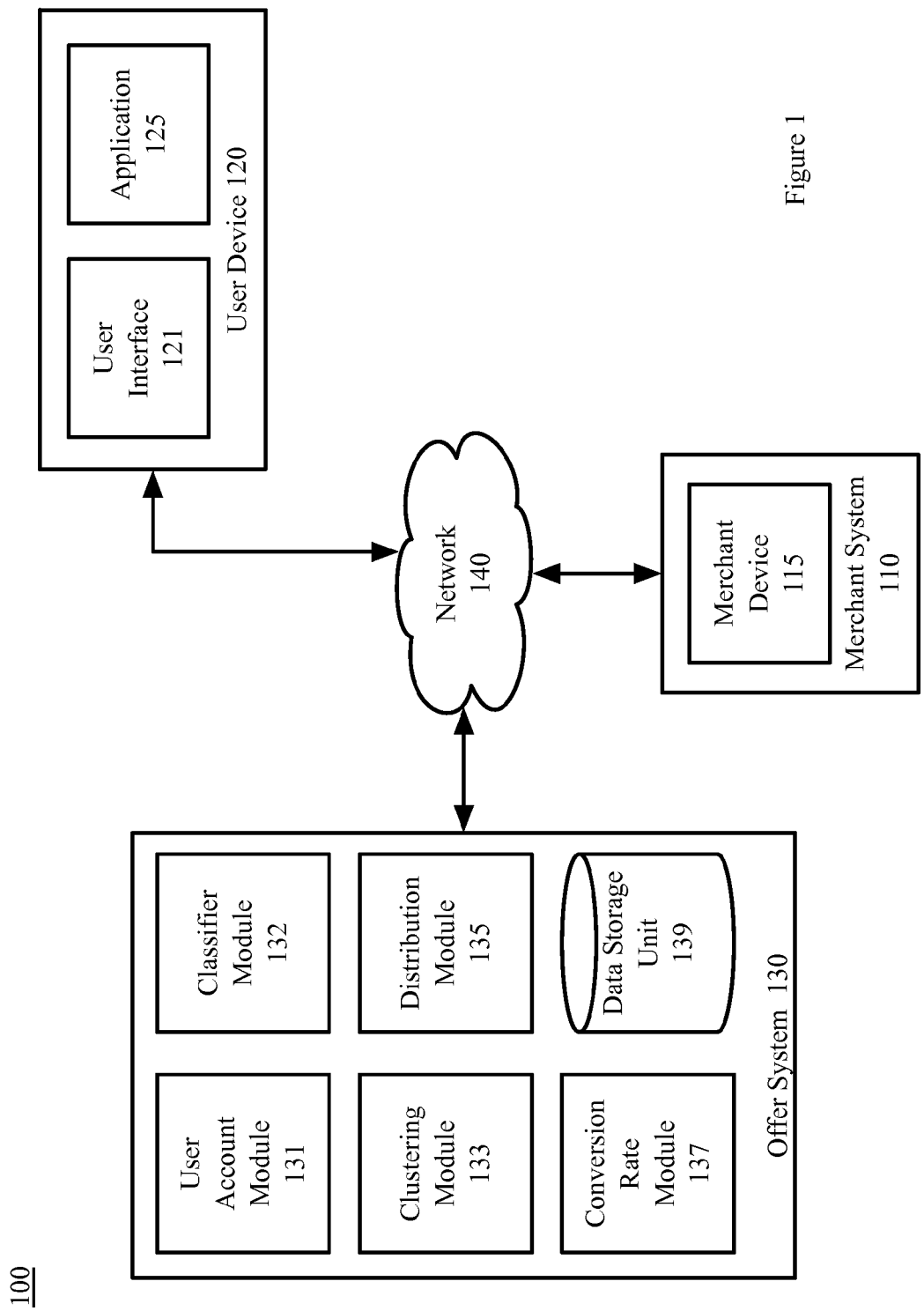
FIG. 1 is a block diagram depicting an offer system, in accordance with certain example embodiments.

The example embodiments described herein provide computer-implemented techniques for determining quality signals for electronic mail offer campaigns. In an example embodiment, an offer system transmits offers to users who have registered for an offer program, enabled the offer program, or otherwise authorized the offer program on the user's device. In an example embodiment, the offers are transmitted in daily or periodic electronic mail transmissions to the registered users. Each electronic mail transmission may comprise multiple offers. The offer system determines which offers and/or the order in which the offers are listed in the electronic mail transmission based on quality signal information collected from one or more identified clusters of registered users. Additionally, the offer system determines which users to transmit the electronic mail transmissions to based on the quality signal information collected from one or more clusters or groupings of registered users.

When a user registers for the offer program, the user provides user information to the offer system (for example, information about the user's interests, shopping habits, demographic information, frequented merchants, or other information about the user). The offer system receives the information submitted by each user, and analyzes the information to learn features of the user and detect patterns. In an example embodiment the offer system creates an artificial neural network or other form of adaptive system model, wherein the offer system analyzes data and relationships to find patterns in data. In an example embodiment, the offer system gathers multiple, perhaps hundreds or thousands of features submitted by registered users. The offer system analyzes the features and learns to identify feature patterns and to identify or predict a number of higher-level features. In an example embodiment, this process is an ongoing learning process, wherein features are continuous added to the offer system and the process is updated. Using the feature patterns identified and/or predicted the offer system clusters the users. In an example embodiment, each cluster of users shares one or more identified and/or predicted features. In another example embodiment, the offer system renders the feature patterns identified and/or predicted into a multi-dimensional graph that plots the distribution of the users. In an example embodiment, an algorithm is used to plot a two dimensional graph.

An offer is created by a merchant system, manufacturer system, offer system, and/or alternative offer provider and distributed to potential users. In an example embodiment, the offer is a non-prepaid offer for which the user does not pay a fee to obtain (for example, a loyalty reward, a coupon, discounts, or other offer redeemable with a merchant, manufacturer, service provider, and/or provider of goods). In another example embodiment, the offer is a prepaid offer, and the user pays a predetermined price for the products associated with the offer. In an example embodiment, the offer system receives the offer and transmits the offer to a limited number of registered users. In an example embodiment, the offer is transmitted to a limited number of registered users in each user cluster, thereby transmitting the offer to users with different identified/predicted features. In another example embodiment, the offer is transmitted it to a limited number of registered users without accounting for the different identified/predicted features.

The user operates a user computing device to select or otherwise interact with the offer distributed by the offer system. In an example embodiment, the user selects the offer by clicking on it, pressing a button to "save" the offer, or by other suitable operation to indicate a desire to select and/or save the offer. In another example embodiment, the offer is a prepaid offer, and the user selects the offer by agreeing to purchase the offer. The user can download, select, scan, or otherwise capture the offer via the user computing device and import the offer specifics (such as merchant, product, value, redemption rules, and other specifics) to the user computing device. By selecting the offer, the user authorizes transmission of a notification to the offer system that the user is interested in the offer.

The offer system receives notification that the user interacted with the offer. In an example embodiment, the offer system receives notification indicating the whether the user viewed, selected, prepaid, saved, or deleted the offer without interacting with it. In an example embodiment, the offer system receives the notification within a pre-defined amount of time after the offer was distributed. In an example embodiment, based on the information received, the offer system determines the conversion rate, or other metric used to determine the efficiency of the limited offer campaign. The offer system analyzes the conversion rate or other metric and determines if it exceeds a pre-defined threshold. Based on the offer system's analysis, it transmits the offer to the remaining users in each user cluster where the conversion rate exceeds the pre-defined threshold.

In another example embodiment, the offer system marks a representation of each user that interacts with the offer on the rendered graph. For example, the offer system changes the color of the mark that represents each user that interacts with the offer marked on the graph. The offer system analyzes the graph and identifies one or more groups of users that interacted with the offer based on the marked representations on the graph. For example, the offer system identifies groups of users on the graph by grouping clusters of colored marks. The offer system then transmits the offer to the remaining users in the identified groups of users.

In an example embodiment, the offer system repeats these methods with multiple offers. Based on the offer system's analysis of the conversion rate for each offer within each user cluster or of the rendered graph, it determines the order in which the multiple offers will appear in a single or multiple electronic mail transmissions to the users within the user cluster or identified group. In an example embodiment, the order is different for each user cluster or identified group based on the offer system's analysis. In an example embodiment, the offer system's analysis is used to determine the title or subject of the electronic mail transmission.

The functionality of various example embodiments will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting an offer system, in accordance with certain example embodiments. As depicted in FIG. 1, the exemplary operating environment 100 comprises a merchant system 110, a user device 120, and an offer system 130 that are configured to communicate with one another via one or more networks 140. In another example embodiment, two or more of these systems (including systems 110, 120, and 130) are integrated into the same system. In some embodiments, a user associated with a device must install an application and/or make a feature selection to obtain the benefits of the techniques described herein.

Each network 140 includes a wired or wireless telecommunication means by which network systems (including systems 110, 120, and 130) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network system (including systems 110, 120, and 130) includes a device having a communication module capable of transmitting and receiving data over the network 140. For example, each network system (including systems 110, 120, and 130) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120, and 130) are operated by merchants, users, and an offer system operator, respectively.

The merchant system 110 comprises at least one merchant device 115. In an example embodiment, the merchant device 115 may be a personal computer, mobile device (for example, notebook, computer, tablet computer, netbook computer, personal digital assistant ("PDA"), video game device, GPS locator device, cellular telephone, Smartphone or other mobile device), television, or other appropriate technology that includes or is coupled to a web server, or other suitable application for interacting with web page files. The merchant can use the merchant device 115 to create offers for distribution by the offer system 130.

In an example embodiment, the user device 120 may be a personal computer, mobile device (for example, notebook, computer, tablet computer, netbook computer, personal digital assistant ("PDA"), video game device, GPS locator device, cellular telephone, Smartphone or other mobile device), television, or other appropriate technology that includes or is coupled to a web server, or other suitable application for interacting with web page files. The user can use the user device 120 to register for an offer program and/or view offers distributed by the offer system 130 via a user interface 121 and an application 125. The application 125 is a program, function, routine, applet or similar entity that exists on and performs its operations on the user device 120. For example, the application 125 may be one or more of a shopping application, merchant system 110 application, an Internet browser, a digital wallet application, a loyalty card application, another value-added application, a user interface 121 application, or other suitable application operating on the user device 120. In some embodiments, the user must install an application 125 and/or make a feature selection on the user device 120 to obtain the benefits of the techniques described herein.

An example application 125 can receive electronic mail and web page files from the offer system 130 that comprise offers and can display the offers to users operating the user device 120. The application 125 also may comprise a mobile application that resides on a mobile device, such as the user device 120, of the user. In an example embodiment, the user may access the application 125 to create, modify, access, or view an account with the offer system 130 (for example, a digital wallet account, personal account, financial account, offer account, loyalty account, merchant account, or other type of user account) and to access, view, perform a purchase, save, or otherwise interact with an offer presented by the offer system 130.

In an example embodiment, the user may use the application 125 to register with the offer system 130. In another example embodiment, the user may register with the offer system 130 through the user's digital wallet. An example offer system 130 comprises a user account module 131. An example user account module 131 receives the user's registration information when the user registers for the offer program with the offer system 130. In an example embodiment, when the user registers for the offer program, the user provides user information to the offer system 130, for example, information about the user's interests, shopping habits, demographic information, frequented merchants, or other information about the user.

In an example embodiment, the user information is transmitted to the classifier module 132 for analysis. The classifier module 132 analyzes the information to learn features of the user and detect patterns. In an example embodiment, the classifier module 131 comprises an artificial neural network or other form of adaptive system module that analyzes data and relationships to find patterns in the data. In an example embodiment, the module is used to predict features of the registered user that will aid in determinations as to whether the user is likely to interact with an offer. In an example embodiment, the offer system 130 gathers multiple, perhaps hundreds or thousands of features submitted by registered users. In an example embodiment, this process is an ongoing learning process, wherein data is continuously added and analyzed.

Using on the feature patterns identified and predicted by the classifier module 132, the clustering module 133 clusters the users. In an example embodiment, an algorithm is used to cluster the users. In an example embodiment, each cluster of users shares one or more identified and/or predicted features.

In another example embodiment, the clustering module 133 uses the features to renders a multi-dimensional graph that plots a distribution of the users. In this example, the graph visually displays the different features of the users. In an example embodiment, an algorithm or visualization technique is used to render the graph.

An example offer system 130 further comprises an offer distribution module 135. The offer distribution module 135 receives offers from the merchant system 110, a manufacturer system (not shown), and/or other offer creators and distributes the offers to users for review and selection. In an example embodiment, the offer system 130 creates the offers. In another example embodiment, the offer system 130 may generate web-based user interfaces providing forms for the merchant system 110 to create offers. The offer distribution module 135 distributes offers through selected distribution channels. In an example embodiment, the offers are distributed through electronic messages or other forms of electronic media. In an example embodiment, the offer system 130 receives the offer and transmits the offer to a limited number of registered users in each identified user cluster, thereby transmitting the offer to users with different identified/predicted features. In another example embodiment, the offer system 130 transmits the offer to a limited number of registered users without regard to user clusters.

The user operates the user device 120 to select or otherwise interact with the offer distributed by the offer system 130. In an example embodiment, the user selects the offer by clicking on it, pressing a button to "save" the offer, or by other suitable operation to indicate a desire to select and/or save the offer. In another example embodiment, the offer is a prepaid offer, and the user selects the offer by agreeing to purchase the offer. The user can download, select, scan, or otherwise capture the offer via the user device 120 and import the offer specifics (such as merchant, product, value, redemption rules, and other specifics) to the user device 120. By selecting the offer, the user authorizes transmission of a notification to the offer system 130 that the user is interested in the offer.

In an example embodiment, the conversion rate module 137 receives notification that the user interacted with the offer. Based on the information received, the conversion rate module 137 determines the conversion rate, or other metric used to determine the efficiency of the limited offer campaign, for each cluster of users. In an example embodiment, the conversion rate module 137 analyzes the conversion rate, or other metric, for each user cluster and determines if it exceeds a pre-defined threshold. Based on the analysis, the distribution module 135 transmits the offer to the remaining users in each user cluster where the conversion rate exceeds the pre-defined threshold.

In another example embodiment, the clustering module 133 receives the notification that the user interacted with the offer and marks a representation of each user on the rendered graph. In this embodiment, the clustering module 133 changes the representation of each user to a new representation visually indicating that the user interacted with the offer. The clustering module 133 analyses the rendered graph and determines groupings of users with the new representation. In an example embodiment, each grouping represents a group of users with a similar feature that will likely be interested in the offer. Based on the analysis and identified groupings, the distribution module 135 transmits the offer to the remaining users in each group.

The offers and user account information are saved in the data storage unit 139. In an example embodiment, the data storage unit 139 can include any local or remote data storage structure accessible to the offer system 130 suitable for storing information. In an example embodiment, the data storage unit 139 stores encrypted information, such as HTML5 local storage.

The components of the example operating environment 100 are described hereinafter with reference to the example methods illustrated in FIGS. 2-4. The example methods of FIGS. 2-4 may also be performed with other systems and in other environments.

Example System Processes

Figure 2:
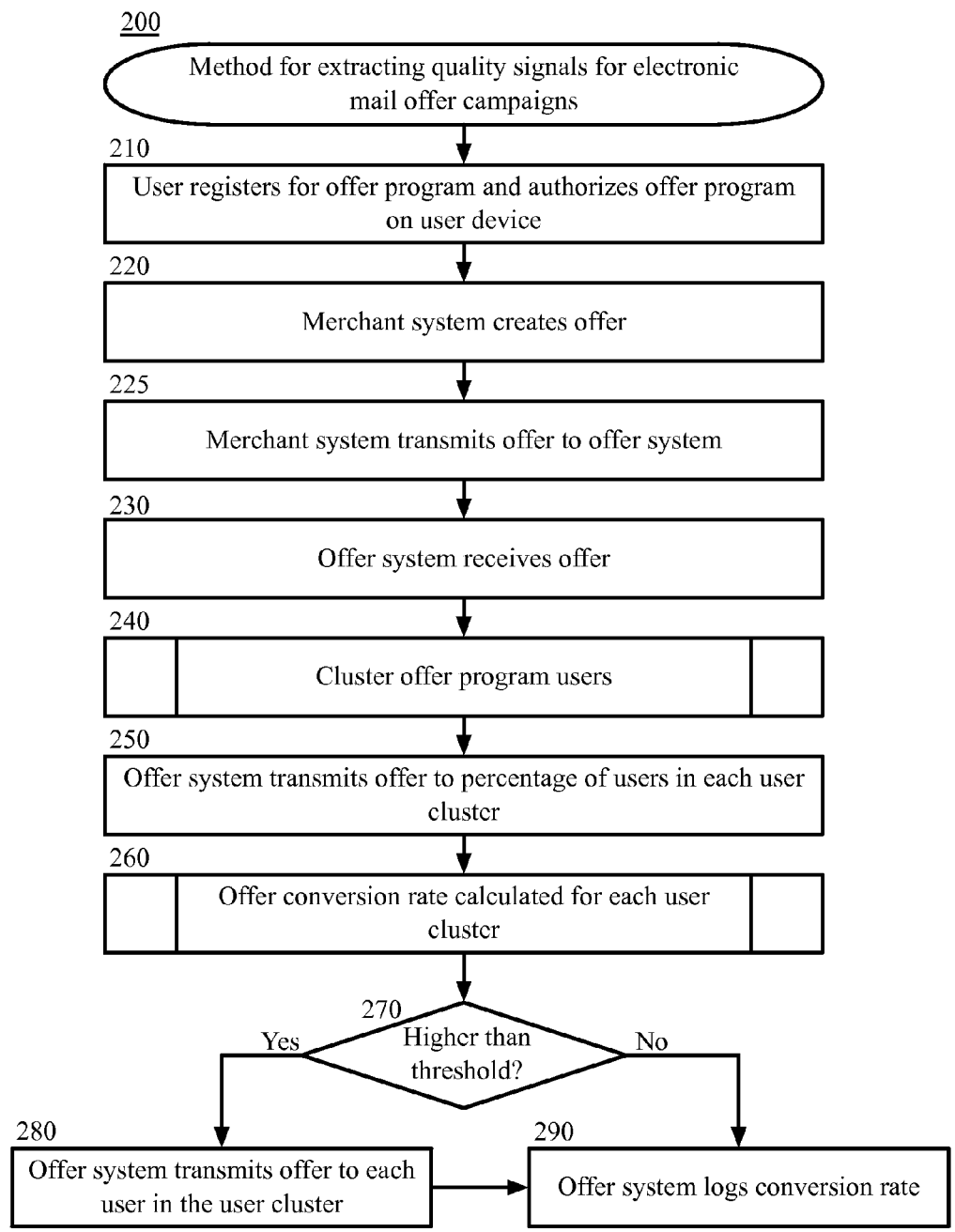
FIG. 2 is a block flow diagram depicting a method for extracting quality signals for electronic mail offer campaigns, in accordance with certain example embodiments.

FIG. 2 is a block flow diagram depicting a method for extracting quality signals for electronic mail offer campaigns, in accordance with certain example embodiments. The method 200 is described with reference to the components illustrated in FIG. 1.

In block 210, the user registers with the offer system 130 and/or the offer program. In an example embodiment, the user installs, downloads, or otherwise enables the offer program and/or offer program application 125 on the user device 120. In an example embodiment, the user can enable the application 125 on more than one user device 120.

In block 220, the merchant system 110 creates one or more offers. In another example embodiment, the offers are created by a manufacturer system (not shown), the offer system 130, or any other system. In an example embodiment, the offers may include, but are not limited to, coupons, loyalty points, prepaid offers, rebates, and other forms of value added services. In this embodiment, the offers may comprise merchant offers, manufacturer offers, third party offers, and other types of offers. In an example embodiment, the offers are for a specific product or group of products. For example, the offer may be for $1.00 off Brand A laundry detergent or $1.00 off a Manufacturer X product. These offers may be redeemed at any merchant that accepts manufacturer coupons. In an alternative example embodiment, the offers are for a particular merchant. For example, the offer may be for $10 off a $50 purchase at Merchant Q. In an alternative example embodiment, the offers comprise loyalty reward point redemptions. For example, the offer may be for 10 loyalty points for every purchase of a Manufacturer X product.

In an example embodiment, the offers comprise details on how the offer can be redeemed and redemption rules. For example, the offer may comprise the identification of the item to be purchased, such as product title, brand information, universal product code ("UPC"), a stock keeping unit ("SKU"), a Japanese article number ("JAN"), a world product code ("WPC"), International Standard Book Number ("ISBN"), European Article Number ("EAN"), color, size, and other relevant sale information.

In an example embodiment, each offer will have one or more rules or conditions associated with it. These rule include, but are not limited to a purchase threshold (for example, receive $1.00 off Brand Z laundry detergent that is regularly priced $5.00 or more, or $10 single purchase of more than $50 from Merchant X), an aggregate purchase threshold (for example, receive $10 off next purchase from a merchant after the accumulated purchase of Manufacturer B products has reached $100), a minimum number of purchases of an item (for example, receive $10 off your tenth purchase of Brand Z items), a time restriction (for example, receive $10 off a lunch-time purchase), a maximum discount (for example, the merchant system 150 sets $10 off as a maximum and user A gets $1 off, while user B gets $2 off), and/or a location restriction (for example, receive $10 off a purchase at a specified location). In an example embodiment, these rules are set by the merchant system 110 at the time the offer is created and reviewed before the offer is applied. In another example embodiment, the offer is a prepaid offer and the redemption rules may include an expiration date. The offer content and discount may be personalized to a particular user. For example, user A may receive a 5% off coupon for a particular product or service while user B may receive a 10% off coupon for the same product or service.

In block 225, the merchant system 110 transmits the offer(s) to the offer system 130. In an example embodiment, the merchant system 110 creates the offer outside of the offer system 130. In another example embodiment, the offer system 130 may generate web-based user interfaces providing forms for the merchant system 110 to create offers.

In block 230, the offer system 130 receives the offers. In an example embodiment, the offers can be received electronically on a regular basis (for example, daily/weekly), as part of a pull from the offer system 130, and/or as part of a push from the merchant system 110 to the offer system 130. In an example embodiment, the offers are saved in the data storage unit 139.

In block 240, the offer system 130 clusters the registered users based on the registration information provided by the users. The method for clustering program users is described in more detail hereinafter with reference to the methods described in FIG. 3.

Figure 3:
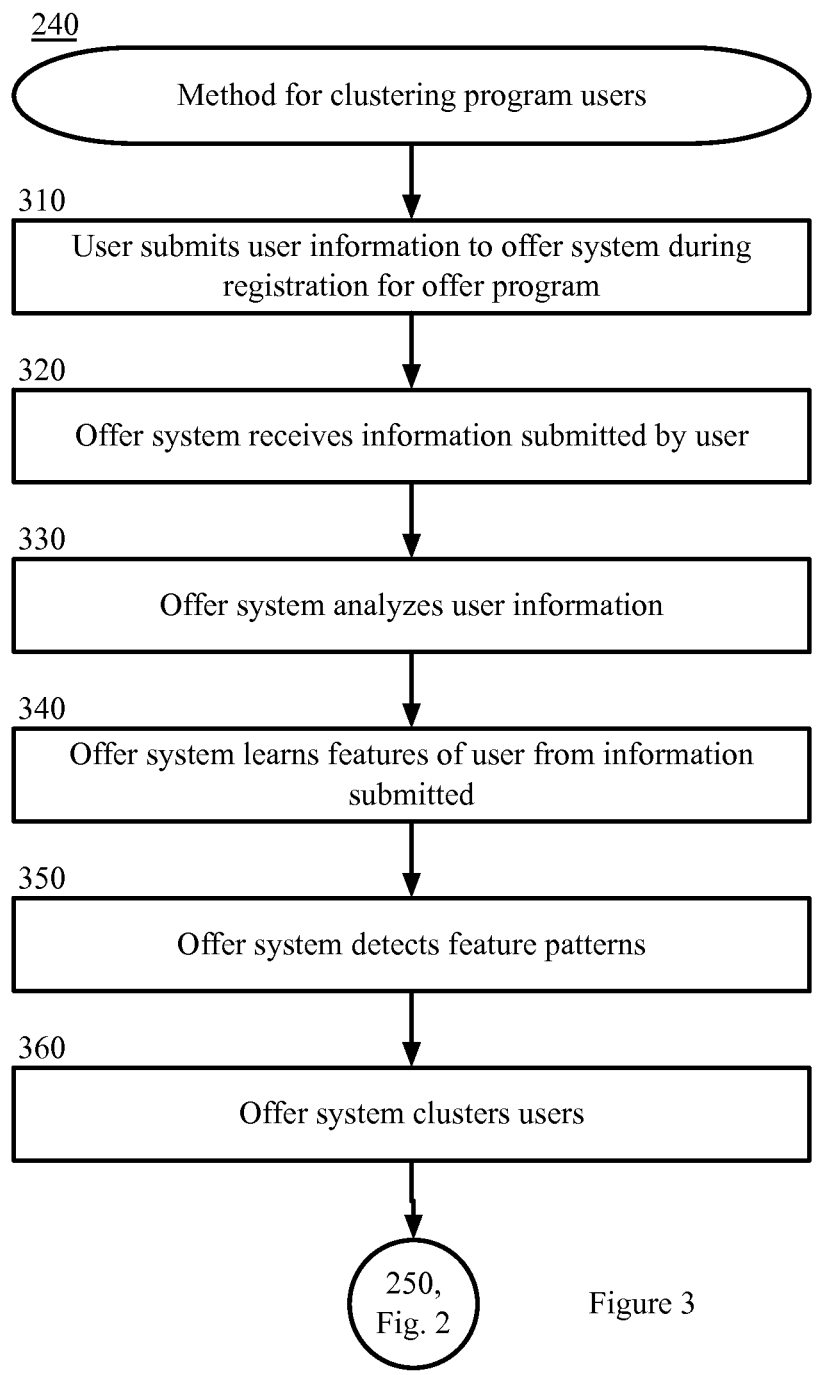
FIG. 3 is a block flow diagram depicting a method for clustering program users, in accordance with certain example embodiments.

FIG. 3 is a block flow diagram depicting a method 240 for clustering program users, in accordance with certain example embodiments, as referenced in block 240. The method 240 is described with reference to the components illustrated in FIG. 1.

In block 310, the user submits user information to the offer system 130. In an example embodiment, the user provides user information to the offer system 130 when registering for the offer program. In this embodiment, the user may optionally provide any of the requested information to the offer system 130. In another example embodiment, the user may decline to provide any user information to the offer system 130. In an example embodiment, the requested information comprises information about the user's interests, shopping habits, demographic information, frequented merchants, or other information about the user.

In block 320, the offer system 130 receives the user information submitted by the user. In an example embodiment, the user information is saved in the data storage unit 139.

In an example embodiment, the user can add, edit, change, delete, or provide additional information at any time after registering with the offer program. In another example embodiment, the user can disable or uninstall the application 125 at any time. In this embodiment, the user information is removed from the offer system 130.

In situations in which the technology discussed here collects personal information about the user, or may make use of personal information, the user may be provided with a opportunity to control whether programs or features collect user information (for example, information about the user's purchases, social network, social actions or activities, profession, a user's preferences, or a user's current location), or to control whether and/or how to receive content from the user device 120 and/or offer system 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of the user cannot be determined. Thus, the user may have control over how information is collected about the user and used by the offer system.

In block 330, the offer system 130 analyzes information submitted by multiple users and/or the offer system 130 operators. In an example embodiment, the information is analyzed to learn features of users and detect feature patterns. In an example embodiment, the offer system 130 comprises an artificial neural network or other form of adaptive system module that analyzes data and relationships to find patterns in the data. In an example embodiment, the information is fed into a neural network, which has been trained with known related user features. In this embodiment, each feature is classified into one or more related features. The neural network will learn how to classify features and identify related features using a number of features previously entered as training data. The neural network will build it's own model based on the training data that is provided. As more training data is fed into the model, it will continuously improve. In an example embodiment, the module is used to predict features of the registered user that will aid in determinations as to whether the user is likely to interact with an offer.

In block 340, the offer system 130 learns or predicts features of the user from the information submitted. In an example embodiment, the offer system 130 creates a feature prediction model. In an example embodiment, the offer system 130 produces an algorithm to adjust the weights of the prediction model in order to accurately identify or predict features of the users.

In block 350, the offer system detects feature patterns of the user. In an example embodiment, the offer system 130 identifies features of the user information submitted and applies an algorithm to predict additional features. In an example embodiment, the offer system 130 has learned feature patterns that are related, as described previously with reference to blocks 330 and 340 of FIG. 3. In an example embodiment of block 350, the offer system 130 analyzes the information submitted by the user in block 310 to extract features, to compare the extracted features with the features associated with related features, and to determine the extracted features match or correlate sufficiently with any of the related features. If the offer system 130 determines that the extracted features match or correlate sufficiently with any of the related features, then the offer system 130 identifies the related features.

In block 360, the offer system 130 clusters the users. In an example embodiment, each cluster of users comprises users with similar features or feature patterns. In an example embodiment, a clustering algorithm is used to cluster the users. An example clustering algorithm is a k-means algorithm, a bisecting k-means algorithm, a hierarchical agglomerative clustering algorithm, or a spectral clustering algorithm. In another example embodiment, an algorithm that divides the users into two clusters is used. Then each of these clusters is recursively divided into two sub-clusters, and so on until a level is reached where the resulting cluster has more than 'n' users. In yet another example embodiment, a variant of the bisecting k-means algorithm can be used, where the clusters are divided into five or ten or any suitable number of sub clusters at each level. In an example embodiment, the offer system 130 identifies more than one user cluster, thereby transmitting the offer to users with different identified/predicted features.

The method 240 then proceeds to block 250 in FIG. 2.

Returning to FIG. 2, in block 250, the offer system 130 transmits the offer to a percentage of users in each of the identified user clusters. In an example embodiment, the percentage of users in each identified user cluster is a pre-determined small percentage of the number of users in the cluster (for example, 1 to 10% of the number of users in the cluster). In an example embodiment, the offer is transmitted in electronic format to the user (for example, via electronic mail). In another example embodiment, more than one offer is transmitted in the same electronic mail transmission to the same user. In an example embodiment, the order of the offers in the same electronic mail transmission is different for different users identified to receive the same offer (for example, the offer is listed first for some users, but listed second, or third for other users).

In block 260, the offer conversion rate is calculated for each user cluster. The method for determining an offer conversion rate is described in more detail hereinafter with reference to the methods described in FIG. 4.

Figure 4:
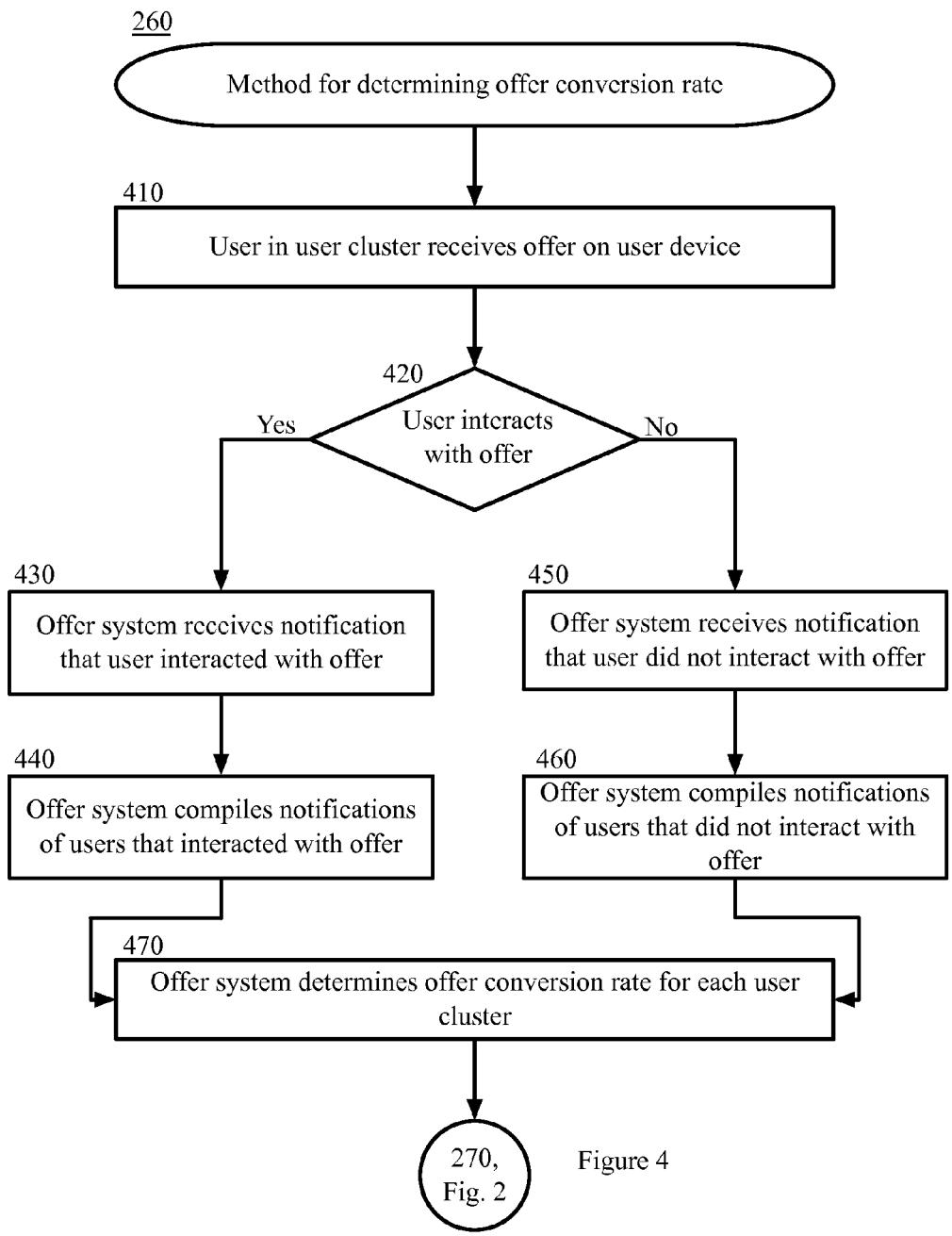
FIG. 4 is a block flow diagram depicting a method for determining an offer conversion rate, in accordance with certain example embodiments.

FIG. 4 is a block flow diagram depicting a method 260 for determining an offer conversion rate, in accordance with certain example embodiments, as referenced in block 260. The method 260 is described with reference to the components illustrated in FIG. 1.

In block 410, a user in a user cluster receives the offer on the user device 120. In an example embodiment, the user is capable of opening, reading, or otherwise interacting with the offer using the application 125 on the user device 120.

In block 420, the user determines whether to interact with the offer. In an example embodiment, the user simply deletes the offer transmission, ignores it, or otherwise not interact with the offer (for example, the transmission was flagged as spam and not presented to the user). In another example embodiment, the user can read, click on, purchase, save, redeem, forward, print, or otherwise interact with the offer. In an example embodiment, the period for determining whether the user interacts with the offer is a predefined amount of time set by the offer system 130.

In an example embodiment, the user authorizes transmission of a notification to the offer system 130 regarding whether the user interacts with the offer. In an example embodiment, the user authorizes the transmission of the notification when the user registers for or enables the offer program. In an example embodiment, the user can retract the authorization at any time.

If the user interacts with the offer, the method 270 proceeds to block 430 in FIG. 4.

In block 430, the offer system 130 receives notification that the user interacted with the offer. In an example embodiment, the offer system 130 receives the notification in real time. In another example embodiment, the offer system 130 receives the notification at a pre-determined interval of time after the transmission of the offer to the user. In an example embodiment, the offer system 130 is notified of each user that interacts with the offer.

In block 440, the offer system 130 compiles all the notifications of users that interacted with the offer.

The method 270 then proceeds to block 470 of FIG. 4.

Returning to block 420, if the user does not interact with the offer, the method 270 proceeds to block 450.

In block 450, the offer system 130 receives notification that the user did not interact with the offer. In an example embodiment, the offer system 130 receives the notification in real time with an action taken by the user to indicate the user is not interested in the offer (for example, deleting the offer transmission). In another example embodiment, the offer system 130 receives the notification at a pre-determined interval of time after the transmission of the offer to the user. In an example embodiment, the offer system 130 is notified of each user that does not interact with the offer.

In block 460, the offer system 130 compiles all the notifications of users that did not interact with the offer.

In block 470, the offer system 130 determines an offer conversion rate for each user cluster. In an example embodiment, the offer system 130 compiles the notifications that the users interacted or did not interact with the offer and separates the notifications by user cluster. The offer system 130 then uses the notifications to determine a percentage of users for each identified user cluster that interacted with the offer.

The method 260 then proceeds to block 270 in FIG. 2.

In block 270, the offer system 130 determines whether the conversion rate is higher than a pre-defined threshold for each user cluster. In an example embodiment, the threshold is a percentage value determined by the offer system 130 or the merchant system 110.

If the conversion rate is higher than the predefined threshold for the user cluster, the method 200 proceeds to block 280.

In block 280, the offer system 130 transmits the offer to each user in the user cluster.

The method 200 then proceeds to block 290.

Returning to block 270, if the conversion rate is not higher than the predefined threshold for the user cluster, the method 200 proceeds to block 290.

In block 290, the offer system 130 logs the conversion rate of the offer for each user cluster. In an example embodiment, the offer system 130 determines a conversion rate for the offer once again after the offer is transmitted to each user in the user cluster.

In an example embodiment, the offer system 130 repeats these methods with multiple offers for the same user clusters. Based on the offer system's 130 analysis of the conversion rate for each offer within each identified user cluster, it determines the order in which the multiple offers will appear in a single or multiple electronic mail transmissions to the users within the identified user cluster. In example embodiment, the order is different for each user cluster based on the offer system's 130 analysis. In an example embodiment, the offer system's 130 analysis is used to determine the title or subject of the electronic mail transmission.

In another example embodiment, the conversion rate is fed into the neural network module to aid in the continuous learning of the model. In another example embodiment, the conversion rate for each offer is used to predict a merchant quality signal. In this embodiment, the merchant quality signal is used to aid in the ordering of the offers in the electronic mail transmission, such that offers from a merchant system 110 with a higher merchant quality signal are ranked higher than offers from a merchant system 110 with a lower merchant quality signal.

Figure 5:
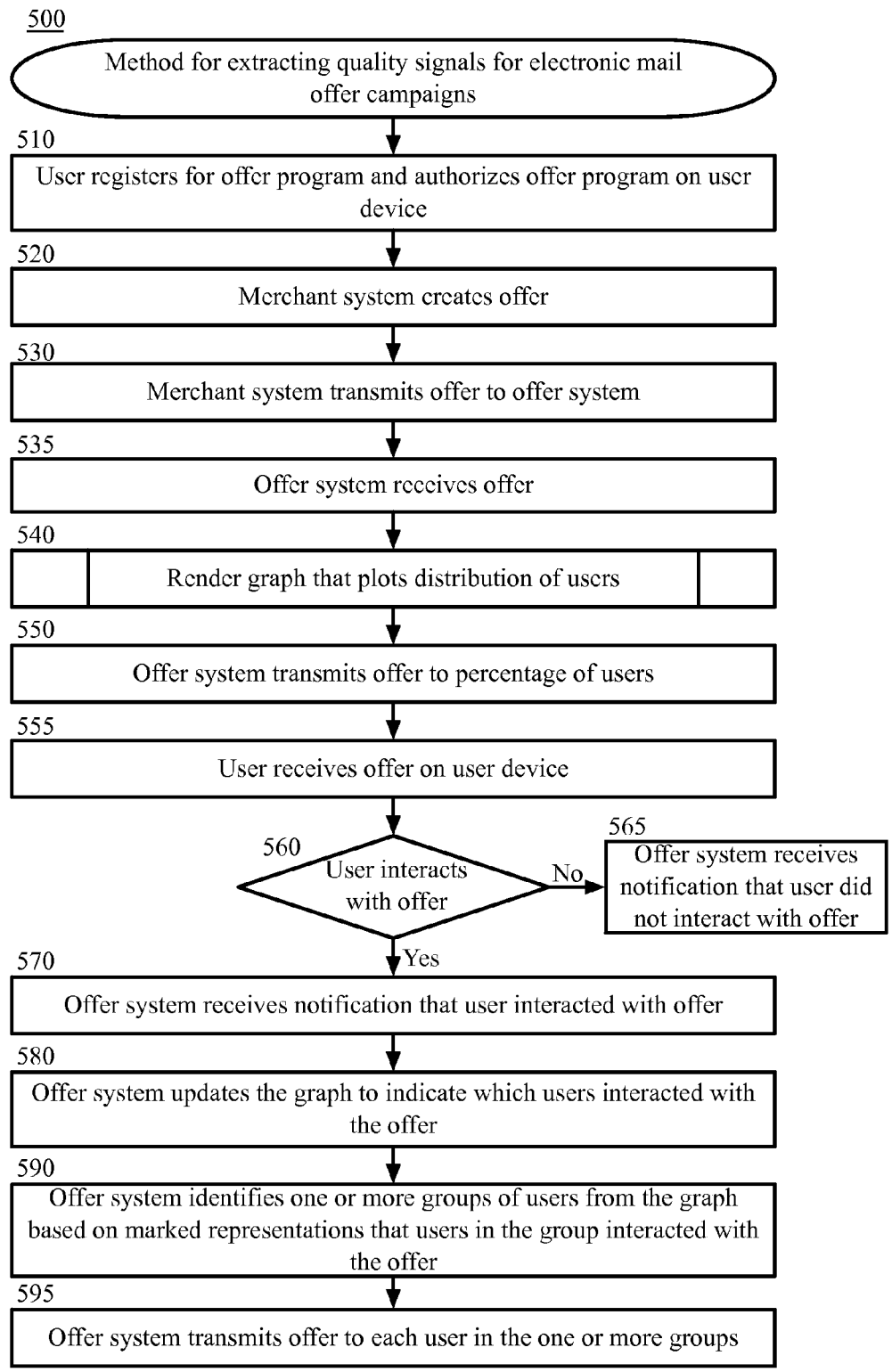
FIG. 5 is a block flow diagram depicting a method for extracting quality signals for electronic mail offer campaigns, in accordance with certain example embodiments.

FIG. 5 is a block flow diagram depicting method 500 for extracting quality signals for electronic mail offer campaigns, in accordance with certain example embodiments. The method 500 is described with reference to the components illustrated in FIG. 1.

In an example embodiment, the methods of described in blocks 510 through 535 of FIG. 5 are similar to the methods described in blocks 210 through 230 of FIG. 2.

In block 510, the user registers with the offer system 130 and/or the offer program. In an example embodiment, the user installs, downloads, or otherwise enables the offer program and/or offer program application 125 on the user device 120. In an example embodiment, the user can enable the application 125 on more than one user device 120.

In block 520, the merchant system 110 creates one or more offers. In another example embodiment, the offers are created by a manufacturer system (not shown), the offer system 130, or any other system. In an example embodiment, the offers may include, but are not limited to, coupons, loyalty points, prepaid offers, rebates, and other forms of value added services. In this embodiment, the offers may comprise merchant offers, manufacturer offers, third party offers, and other types of offers. In an example embodiment, the offers are for a specific product or group of products. For example, the offer may be for $1.00 off Brand A laundry detergent or $1.00 off a Manufacturer X product. These offers may be redeemed at any merchant that accepts manufacturer coupons. In an alternative example embodiment, the offers are for a particular merchant. For example, the offer may be for $10 off a $50 purchase at Merchant Q. In an alternative example embodiment, the offers comprise loyalty reward point redemptions. For example, the offer may be for 10 loyalty points for every purchase of a Manufacturer X product.

In block 530, the merchant system 110 transmits the offer(s) to the offer system 130. In an example embodiment, the merchant system 110 creates the offer outside of the offer system 130. In another example embodiment, the offer system 130 may generate web-based user interfaces providing forms for the merchant system 110 to create offers.

In block 535, the offer system 130 receives the offers. In an example embodiment, the offers can be received electronically on a regular basis (for example, daily/weekly), as part of a pull from the offer system 130, and/or as part of a push from the merchant system 110 to the offer system 130. In an example embodiment, the offers are saved in the data storage unit 139.

In block 540, the offer system 130 renders a graph that plots a distribution of the registered users based on the user features. The method for rendering a graph is described in more detail hereinafter with reference to the methods described in FIG. 6.

Figure 6:
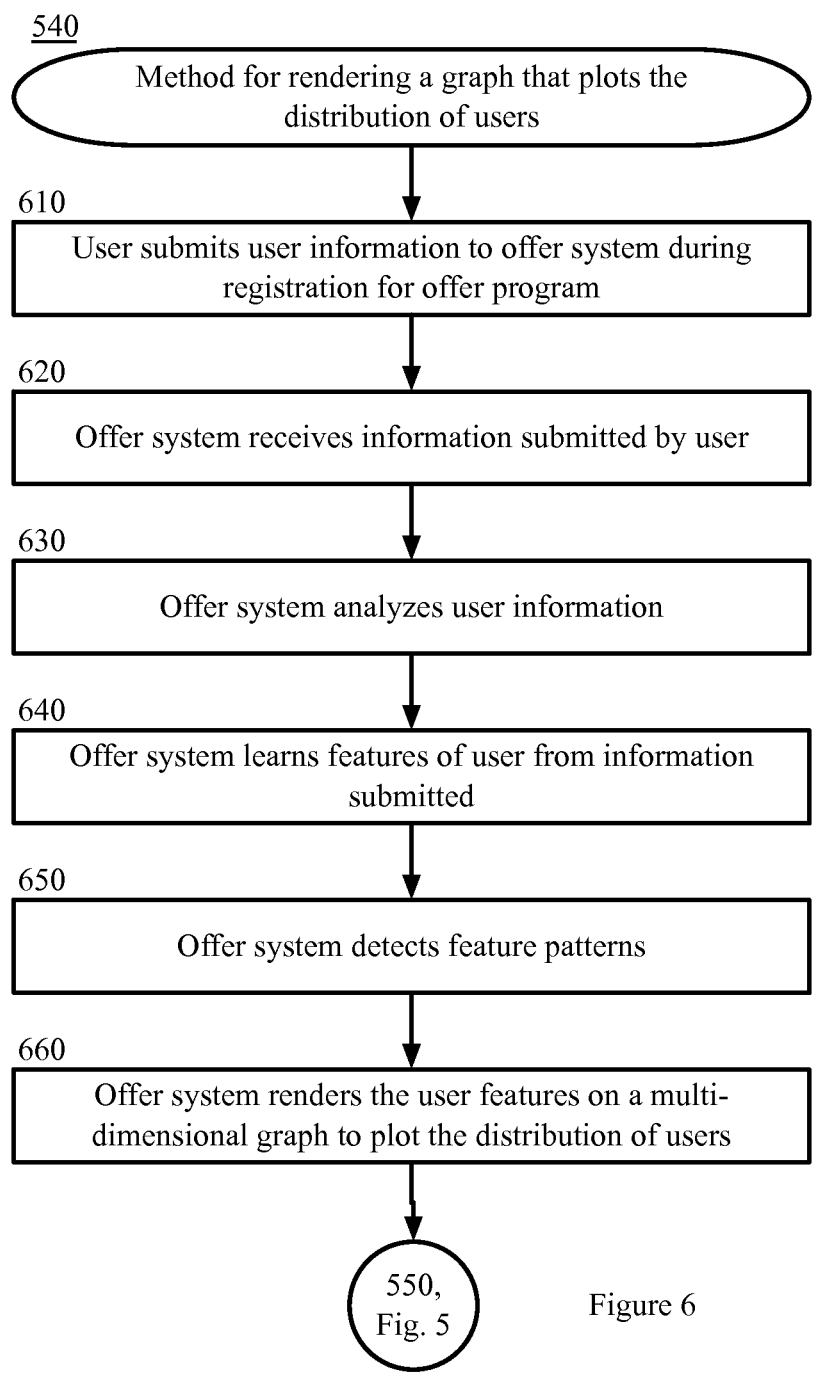
FIG. 6 is a block flow diagram depicting a method for rendering a graph that plots the distribution of users, in accordance with certain example embodiments.

FIG. 6 is a block flow diagram depicting a method 540 for rendering a graph that plots the distribution of users, in accordance with certain example embodiments, as referenced in block 540. The method 540 is described with reference to the components illustrated in FIG. 1.

In an example embodiment, the methods described in blocks 610 through 650 of FIG. 6 are similar to the methods described in blocks 310 through 350 of FIG. 3.

In block 610, the user submits user information to the offer system 130. In an example embodiment, the user provides user information to the offer system 130 when registering for the offer program. In this embodiment, the user may optionally provide any of the requested information to the offer system 130. In another example embodiment, the user may decline to provide any user information to the offer system 130. In an example embodiment, the requested information comprises information about the user's interests, shopping habits, demographic information, frequented merchants, or other information about the user.

In block 620, the offer system 130 receives the user information submitted by the user. In an example embodiment, the user information is saved in the data storage unit 139.

In an example embodiment, the user can add, edit, change, delete, or provide additional information at any time after registering with the offer program. In another example embodiment, the user can disable or uninstall the application 125 at any time. In this embodiment, the user information is removed from the offer system 130.

In situations in which the technology discussed here collects personal information about the user, or may make use of personal information, the user may be provided with a opportunity to control whether programs or features collect user information (for example, information about the user's purchases, social network, social actions or activities, profession, a user's preferences, or a user's current location), or to control whether and/or how to receive content from the user device 120 and/or offer system 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of the user cannot be determined. Thus, the user may have control over how information is collected about the user and used by the offer system.

In block 630, the offer system 130 analyzes information submitted by multiple users and/or the offer system 130 operators. In an example embodiment, the information is analyzed to learn features of users and detect feature patterns. In an example embodiment, the offer system 130 comprises an artificial neural network or other form of adaptive system module that analyzes data and relationships to find patterns in the data. In an example embodiment, the information is fed into a neural network, which has been trained with known related user features. In this embodiment, each feature is classified into one or more related features. The neural network will learn how to classify features and identify related features using a number of features previously entered as training data. The neural network will build it's own model based on the training data that is provided. As more training data is fed into the model, it will continuously improve. In an example embodiment, the module is used to predict features of the registered user that will aid in determinations as to whether the user is likely to interact with an offer.

In block 640, the offer system 130 learns or predicts features of the user from the information submitted. In an example embodiment, the offer system 130 creates a feature prediction model. In an example embodiment, the offer system 130 produces an algorithm to adjust the weights of the prediction model in order to accurately identify or predict features of the users.

In block 650, the offer system detects feature patterns of the user. In an example embodiment, the offer system 130 identifies features of the user information submitted and applies an algorithm to predict additional features. In an example embodiment, the offer system 130 has learned feature patterns that are related, as described previously with reference to blocks 630 and 640 of FIG. 6. In an example embodiment of block 650, the offer system 130 analyzes the information submitted by the user in block 610 to extract features, to compare the extracted features with the features associated with related features, and to determine the extracted features match or correlate sufficiently with any of the related features.

If the offer system 130 determines that the extracted features match or correlate sufficiently with any of the related features, then the offer system 130 identifies the related features.

In block 660, the offer system 130 renders the user features on a graph to plot the distribution of users. In an example embodiment, the graph is a multi-dimensional graph (for example, a two or three-dimensional graph) that aids in the visualization of the different features of the users. In an example embodiment, an algorithm is used to render the graph. In another example embodiment, a visualization technique is used to render the graph (for example, Stochastic Neighbor Embedding (SNE), t-Distributed Stochastic Neighbor Embedding (t-SNE), Symmetric SNE, or visualization technique). In an example embodiment, the t-SNE technique visualizes high-dimensional data by giving each data point (for example, each user) a location in a two or three-dimensional map. The visualization techniques convert high-dimensional data sets into two or three-dimensional representations of individual data points as map points.

The method 540 then proceeds to block 550 in FIG. 5.

Returning to FIG. 5, in block 550, the offer system 130 transmits the offer to a percentage of users. In an example embodiment, the percentage of users is a pre-determined small percentage of the total number of users (for example, 0.01 to 1% of the total number of users). In an example embodiment, the offer is transmitted in electronic format to the user (for example, via electronic mail). In another example embodiment, more than one offer is transmitted in the same electronic mail transmission to the same user. In an example embodiment, the order of the offers in the same electronic mail transmission is different for different users identified to receive the same offer (for example, the offer is listed first for some users, but listed second, or third for other users). In another example embodiment, different offers are sent to a different small percentage of the total number of users.

In block 555, a user identified receives the offer on the user device 120. In an example embodiment, the user is capable of opening, reading, or otherwise interacting with the offer using the application 125 on the user device 120.

In block 560, the user determines whether to interact with the offer. In an example embodiment, the user simply deletes the offer transmission, ignores it, or otherwise not interact with the offer (for example, the transmission was flagged as spam and not presented to the user). In another example embodiment, the user can read, click on, purchase, save, redeem, forward, print, or otherwise interact with the offer. In an example embodiment, the period for determining whether the user interacts with the offer is a predefined amount of time set by the offer system 130.

In an example embodiment, the user authorizes transmission of a notification to the offer system 130 regarding whether the user interacts with the offer. In an example embodiment, the user authorizes the transmission of the notification when the user registers for or enables the offer program. In an example embodiment, the user can retract the authorization at any time.

If the user does not interact with the offer, the method 500 proceeds to block 565.

In block 565, the offer system 130 receives notification that the user did not interact with the offer. In an example embodiment, the offer system 130 receives the notification in real time with an action taken by the user to indicate the user is not interested in the offer (for example, deleting the offer transmission). In another example embodiment, the offer system 130 receives the notification at a pre-determined interval of time after the transmission of the offer to the user. In an example embodiment, the offer system 130 is notified of each user that does not interact with the offer.

Returning to block 560, if the user interacts with the offer, the method 500 proceeds to block 570.

In block 570, the offer system 130 receives notification that the user interacted with the offer. In an example embodiment, the offer system 130 receives the notification in real time. In another example embodiment, the offer system 130 receives the notification at a pre-determined interval of time after the transmission of the offer to the user. In an example embodiment, the offer system 130 is notified of each user that interacts with the offer.

In block 580, the offer system 130 updates the graph to indicate that the user interacted with the offer. In an example the offer system 130 changes or marks the representation of each user that interacts with the offer on the graph. For example, the mark on the graph that represents the user is highlighted in a blue color. In an example embodiment, this process is repeated with multiple offers and interaction with each off is indicated on the graph by a different color.

In block 590, the offer system 130 identifies one or more groups of users from the graph. In an example embodiment, the offer system 130 identifies groups of users on the graph that have similar features than users identified as having interacted with the offer. In this embodiment, the offer system 130 will analyze the graph and identify representations of users that are located in proximity to the marked representations. For example, the offer system 130 will identify a cluster of marks located in proximity to a cluster of blue marks (which indicates that those users interacted with the offer). In an example embodiment, the one or more of the methods identified as being performed by the offer system 130 can be performed by an analyst or an offer system 130 operator.

In block 595, the offer system 130 transmits the offer to each user in the one or more groups of users identified on the graph.

In an example embodiment, the offer system 130 repeats these methods with multiple offers. Based on the offer system's 130 analysis of the user interaction with the offers and the groupings of users on the graph, it determines the order in which the multiple offers will appear in a single or multiple electronic mail transmissions to the users. In example embodiment, the order is different for different user groups based on the offer system's 130 analysis. In an example embodiment, the offer system's 130 analysis is used to determine the title or subject of the electronic mail transmission.

Other Example Embodiments

Figure 7:
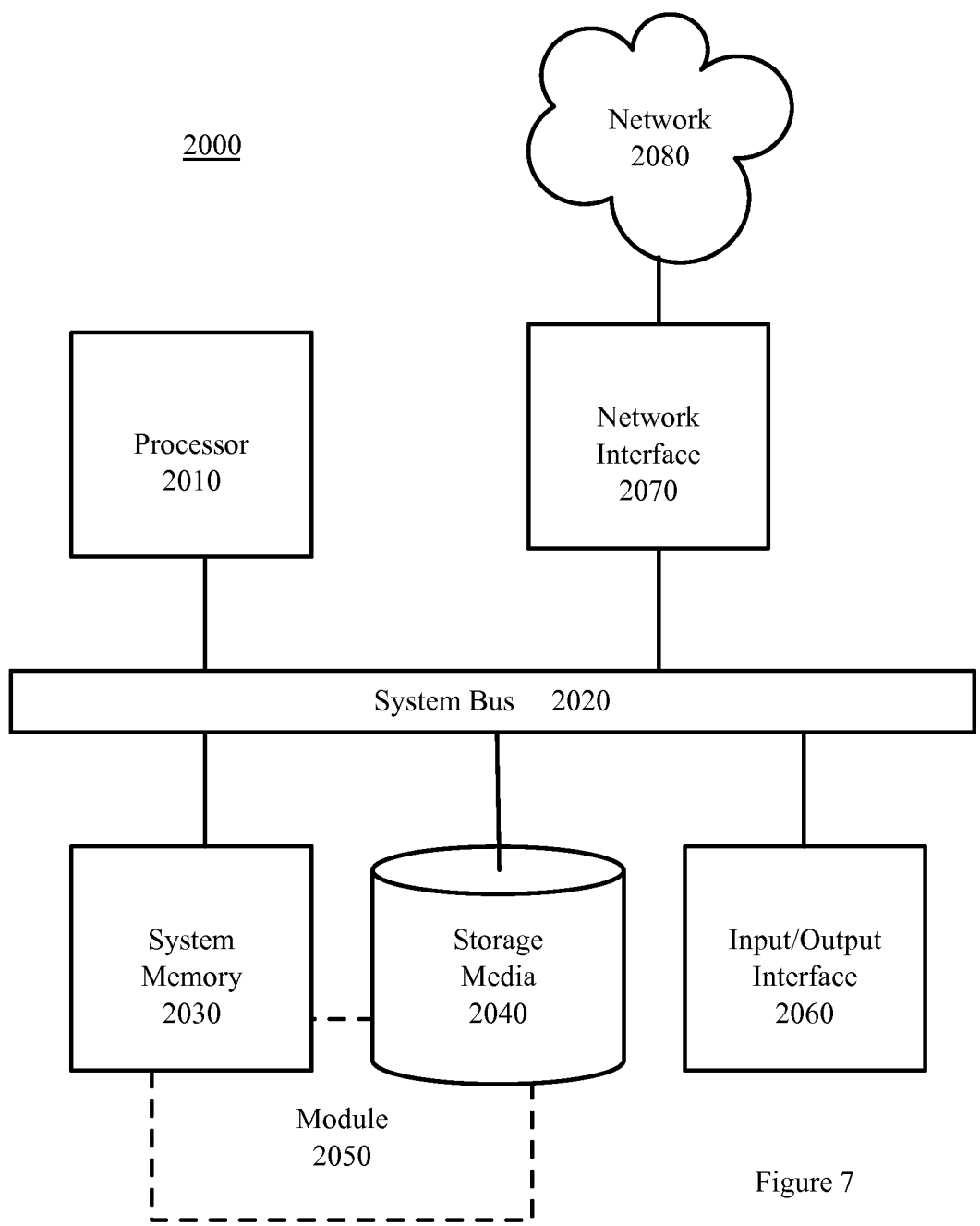
FIG. 7 is a block diagram depicting a computer machine and module, in accordance with certain example embodiments.

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magnetooptical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the claims herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to determine quality signals for offer campaigns, comprising:
   receiving, by one or more computing devices, information from multiple registered users, the information identifying features of each registered user;
   analyzing, by the one or more computing devices, the information from the multiple registered users to identify patterns of the user features;
   clustering, by the one or more computing devices, the registered users into two or more clusters, each cluster of registered users comprising users with similar patterns of the user features;
   transmitting, by the one or more computing devices, an offer to a first group of users within a plurality of the two or more clusters of registered users, the number of users in the first group of each of the plurality of clusters being less than all of the users within each of the plurality of clusters;
   receiving, by the one or more computing devices, notifications of user interaction with the transmitted offer from the first group of users;
   determining, by the one or more computing devices, an efficiency of the offer for each cluster of the plurality of clusters based on the notifications of user interaction with the transmitted offer from the first group of users;
   identifying, by the one or more computing devices, one or more of the plurality of clusters in which the offer has an efficiency that is higher than a configured threshold; and
   transmitting, by the one or more computing devices, the offer to the remaining registered users in each identified cluster of registered users that were not included in the first group.

2. The method of claim 1, wherein the model for identifying user features patterns comprises an artificial neural network or adaptive system model.

3. The method of claim 1, wherein the user interaction comprises an indication that a particular user viewed the offer, selected the offer, prepaid for the offer, saved the offer, or deleted the offer without interacting with it.

4. The method of claim 1, wherein the offer is transmitted to the first group of users by electronic mail correspondence.

5. The method of claim 1, wherein the configured threshold is an efficiency threshold.

6. The method of claim 1, further comprising:
   transmitting, by the one or more computing devices, an additional offer to a second group of users within a plurality of the clusters of registered users;
   receiving, by the one or more computing devices, additional notifications of user interactions with the additional transmitted offer; and
   determining, by the one or more computing devices, an efficiency of the additional transmitted offer for each of the one or more clusters of registered users based on the additional notifications of user interaction with the additional transmitted offer of the second group of users.

7. The method of claim 6, further comprising ordering the offer and the additional offers in an electronic mail correspondence based on the determined efficiency of the offer and additional offers.

8. The method of claim 7, wherein transmitting the additional offer to the remaining registered users in each identified cluster of registered users that were not included in the first group comprises transmitting the electronic mail correspondence comprising the offer and the additional offers orders based on the determined efficiency.

9. A computer program product, comprising:
   a non-transitory computer-readable medium having computer-readable program instructions embodied therein that when executed by a computer cause the computer to determine quality signals for offer campaigns, the computer-readable program instructions comprising:
      computer-readable program instructions to receive information from multiple registered users, the information identifying features of each registered user;
      computer-readable program instructions to cluster the registered users, each cluster of registered users comprising users with similar feature patterns;
      computer-readable program instructions to transmit an offer to a first group of users within a plurality of the clusters of registered users, the number of users in the first group of each of the plurality of clusters being less than all of the users within each of the plurality of clusters;
      computer-readable program instructions to receive notifications of user interaction with the transmitted offer;
      computer-readable program instructions to determine an efficiency of the offer for each of the one or more clusters of registered users based on the notifications of user interaction with the transmitted offer from the first group of users;
      computer-readable program instructions to identify one or more of the plurality of clusters in which the offer has an efficiency that is higher than a configured threshold; and
      computer-readable program instructions to transmit the offer to the remaining registered users in each identified cluster of registered users that were not included in the first group.

10. The computer program product of claim 9, further comprising computer-readable program instructions to analyze the information from the multiple registered users to create a model for identifying user features.

11. The computer program product of claim 10, wherein the model for identifying user features comprises an artificial neural network or adaptive system model.

12. The computer program product of claim 9, wherein the configured threshold is an efficiency threshold.

13. The computer program product of claim 9, further comprising:
- computer-readable program instructions to transmit an additional offer to a second group of users within a plurality of the clusters of registered users;
- computer-readable program instructions to receive additional notifications of user interactions with the additional transmitted offer; and
- computer-readable program instructions to determine an efficiency of the additional offer for each of the one or more clusters of registered users based on the additional notifications of user interaction with the additional transmitted offer of the second group of users.

14. The computer program product of claim 13, further comprising computer-readable program instructions to order the offer and the additional offers in an electronic mail correspondence based on the determined efficiency of the offer and additional offers.

15. The computer program product of claim 14, wherein transmitting the offer to the first group of users in each of the plurality of clusters of registered users comprises transmitting the electronic mail correspondence comprising the offer and the additional offers orders based on the determined efficiency.

16. A system to determine quality signals for offer campaigns, comprising:
- a storage medium; and
- a processor communicatively coupled to the storage medium, wherein the processor executes application code instructions that are stored in the storage medium and that cause the system to:
  - receive information from multiple registered users, the information identifying features of each registered user;
  - cluster the registered users, each cluster of registered users comprising users with similar feature patterns;
  - transmit an offer to a first group of users within a plurality of the clusters of registered users, the number of users in the first group of each of the plurality of clusters being less than all of the users within each of the plurality of clusters;
  - receive notifications of user interaction with the transmitted offer from the first group of users;
  - determine an efficiency of the offer for each of the one or more clusters of registered users based on the notifications of user interaction with the transmitted offer from the first group of users;
  - identify one or more of the plurality of clusters in which the offer has an efficiency that is higher than a configured threshold; and
  - transmit the offer to the remaining registered users in each identified cluster of registered users that were not included in the first group.

17. The system of claim 16, wherein the processor is further configured to execute computer-executable instructions stored in the storage medium to cause the system to:
- transmit an additional offer to a second group of users within the plurality of clusters cluster of registered users;
- receive additional notifications of user interactions with the additional transmitted offer; and
- determine an efficiency of the additional offer for each of the one or more clusters of registered users based on the additional notifications of user interaction with the additional transmitted offer of the second group of users.

18. The system of claim 17, wherein the processor is further configured to execute computer-executable instructions stored in the storage medium to cause the system to order the offer and the additional offers in an electronic mail correspondence based on the determined efficiency of the offer and additional offers.

19. The system of claim 18, wherein transmitting the offer to the registered users in each of the one or more clusters of registered users comprises transmitting the electronic mail correspondence comprising the offer and the additional offers orders based on the determined efficiency.

20. The system of claim 16, wherein the configured threshold is an efficiency threshold.

21. The system of claim 16, wherein the processor is further configured to execute computer-executable instructions stored in the storage medium to analyze the information from the multiple registered users to create a model for identifying user features.

* * * * *